United States Patent [19]

Manning

[11] Patent Number: 4,976,114
[45] Date of Patent: Dec. 11, 1990

[54] AIR CONDITIONING UNIT HAVING AN INTERNAL COMBUSTION ENGINE WHICH IS SUITABLE FOR MOUNTING ON THE ROOF OF A BUILDING

[75] Inventor: Thomas O. Manning, St. Louis Park, Minn.

[73] Assignee: Thermo King Corporation, Minneapolis, Minn.

[21] Appl. No.: 484,315

[22] Filed: Feb. 26, 1990

[51] Int. Cl.$^5$ .............................................. F25B 27/00
[52] U.S. Cl. .................. 62/323.1; 62/259.1; 62/DIG. 16; 165/48.1
[58] Field of Search ........... 62/323.1, 259.1, DIG. 16; 165/48.1; 98/31.6

[56] References Cited

U.S. PATENT DOCUMENTS 2,475,841  7/1949  Jones ................................. 62/323.1
4,217,764  8/1980  Armbruster ........................ 62/323.1

Primary Examiner—Lloyd L. King
Attorney, Agent, or Firm—D. R. Lackey

[57] ABSTRACT

An air conditioning unit having a power pack which includes an internal combustion engine coupled to a refrigerant compressor on a metallic support tray, with said air conditioning unit being suitable for mounting on the roof of a building via support curbing, notwithstanding the noise and vibration produced by the internal combustion engine. The air conditioning unit includes a metallic main frame, to which a metallic power pack support frame is fixed. The power pack support frame includes members which are continuously supported by the main frame via a low frequency damping material, such as cork, and members which extend between the supported members, but which are otherwise unsupported, to enable the unsupported members to function as leaf springs. The support tray of the power pack is mounted to the unsupported members of the power pack support frame via a plurality of isolation mounts.

8 Claims, 5 Drawing Sheets

AIR CONDITIONING UNIT HAVING AN INTERNAL COMBUSTION ENGINE WHICH IS SUITABLE FOR MOUNTING ON THE ROOF OF A BUILDING

TECHNICAL FIELD

The invention relates to air conditioning units for conditioning the air of a building, and more specifically to such a unit in which a refrigerant compressor is driven by an internal combustion engine.

BACKGROUND ART

It is conventional to provide electrically operated roof top air conditioning units for buildings, with such units each having a refrigerant compressor driven by an electric motor. If the building is located in a part of the world which also requires heating facilities, a separate furnace is provided, which may be a natural gas or a fuel oil furnace.

In some parts of the United States, as well as the world, electricity is relatively costly, compared with the cost of natural gas or fuel oil. Thus, it would be economical in such areas to drive the refrigerant compressor with an internal combustion engine which operates on natural gas or fuel oil. Such a unit may include provisions for incorporating an optional natural gas or fuel oil furnace, so that natural gas or fuel oil will be the major fuel for both heating and cooling. Electrical requirements would thus be minimal, even when electric motors are provided for operating evaporator blowers, to make it unnecessary to operate the engine when only air circulation is required.

A major concern of such an arrangement is the transmission of vibration from the internal combustion engine into the building roof structure, and the accompanying emission of noise into the building. It is an object of the present invention to provide an air conditioning unit having a prime mover in the form of an internal combustion engine which is constructed to reduce vibration transmitted into the building roof structure and to reduce noise transmissions into the building, to acceptable levels.

DISCLOSURE OF THE INVENTION

Briefly, the present invention is a new and improved air conditioning unit of the type which has a prime mover in the form of an internal combustion engine, which in a preferred embodiment of the invention is fueled by natural gas or fuel oil. The unit has a main metallic frame which is gasketed to the conventional roof support curbing or dam, to prevent roof moisture from entering the building.

All movable elements of a unit power pack, which include the engine, refrigerant compressor, and radiator and condenser fans, are rigidly mounted to a common support tray. This rigidity provides a trouble-free drive belt system. A bi-directionally mounted idler pulley is also mounted on the support tray, which facilitates adjustment of belt tension in first and second belts which respectively link the idler pulley and engine, and the idler pulley and a fan shaft. The engine and refrigerant compressor are direct coupled in an in-line power system, which minimizes torque input to the support tray.

A power pack metallic support frame has frame elements continuously supported by the main unit frame, via an intermediate vibration absorbing medium, such as cork, or a mixture of cork and rubber. The power pack support frame also includes elements which extend between the supported frame elements which are unsupported, except for the connection of their ends to the supported elements. The unsupported frame elements are thus limber in a vertical plane, similar to a leaf spring.

The power pack support tray is mounted to these "leaf spring" elements via a plurality of isolation mounts, which are located as far away from the engine as possible. The spacing between the engine and mounts permits the isolation mounts to be relatively "soft" without sacrificing control of engine motion.

Thus, the power pack is designed for minimal torque transmission into its support tray, while providing a long life belt system, the power pack is vibration isolated from the power pack support frame via the isolation mounts, and the power pack support frame reduces vibration transmission into the building by the leaf spring construction which permits the power pack to move in a vertical plane on the flexible unsupported portions of the frame members.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
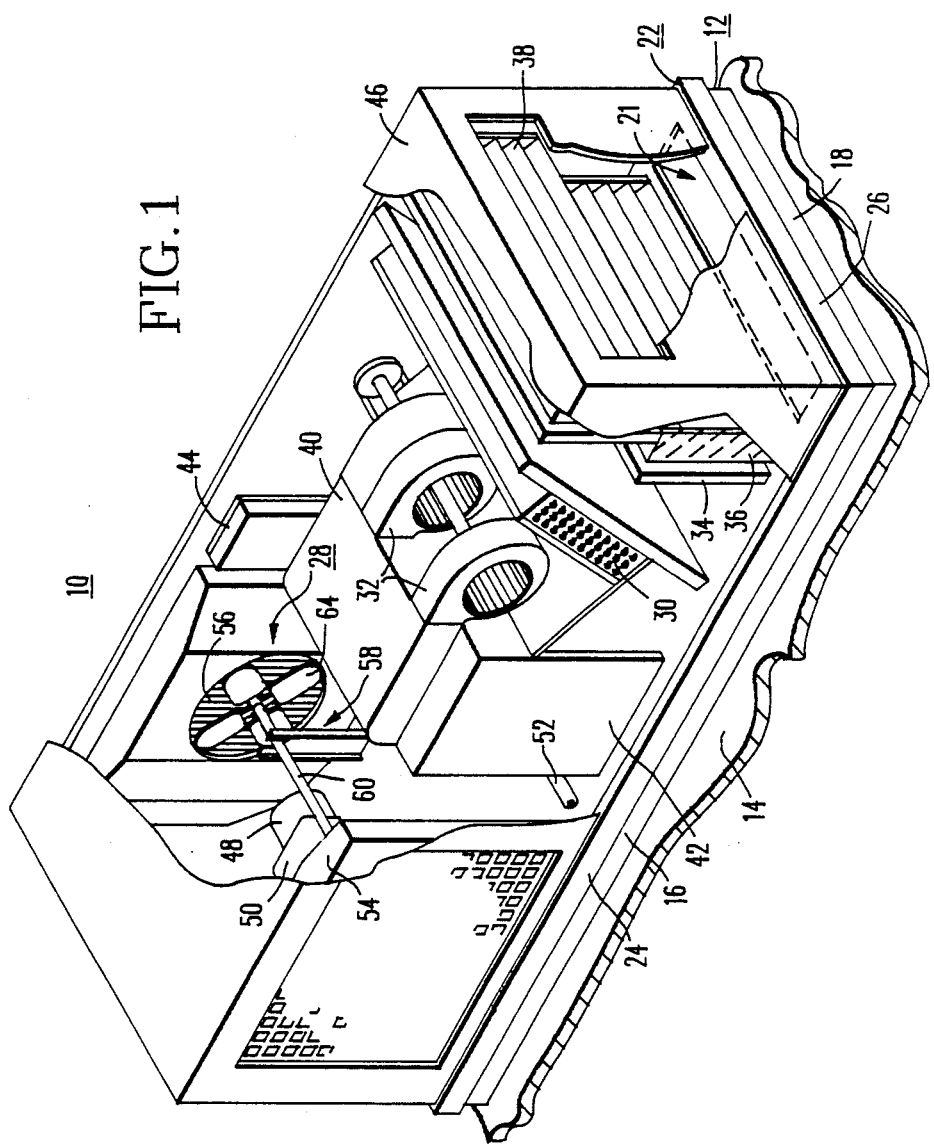
FIG. 1 is a perspective view of an air conditioning unit having a power pack assembly which may be constructed according to the teachings of the invention.

Referring now to the drawings, and to FIG. 1 in particular, there is shown an air conditioner unit 10 of the type which may be constructed according to the teachings of the invention. Air conditioner unit 10 is suitable for mounting on a curb 12 of a building roof 14, with the curb 12 having first and second curb sides, such as curb sides 16 and 16', and first and second curb ends, such as curb ends 18 and 18'. The curb sides and ends collectively define a continuous flat horizontally oriented mounting surface 20 shown in FIG. 4. Roof openings within the perimeter of the curb 12 communicate with air conditioning unit 10, such as return air opening 21, and a discharge air opening (not shown).

The air conditioning unit 10 includes a main unit frame 22 which supports the entire unit 10. The main unit frame 22 has a rectangularly configured outer structure formed of four channel members, including first and second side channel members 24 and 24', and first and second end channel members 26 and 26'. The outer structure of main unit frame 22 is supported by curb surface 20 via a resilient gasket member 29, shown in FIG. 4, which prevents moisture from entering the associated building via the air conditioning unit 10.

Air conditioning unit 10 includes a power pack assembly 28 which is isolated from the remainder of unit 10 according to the teachings of the invention, as will be hereinafter described. The remainder of unit 10 includes an evaporator coil 30, evaporator blowers 32, an air filter 34, and optional return air and fresh air economizers 36 and 38, respectively Evaporator blowers 32 force air into a duct box 40 for delivery to the building via a discharge air opening in roof 14. When the building will also require heating, a natural gas or fuel oil furnace 42 is provided which is also in communication with the duct box 40. A control panel or box 44 along with an outer protective housing 46 complete the basic components of unit 10. Housing 46 includes hinged or removable panels where necessary, for maintenance purposes.

Power pack assembly 28 includes a refrigerant compressor 48 driven by an internal combustion engine 50. Engine 50 and compressor 48 are directly mounted, in-line, to reduce torque transmissions into their support, as well as to reduce maintenance. Internal combustion engine 50 is fueled by natural gas or fuel oil in a preferred embodiment of the invention, with a fuel line 52 providing fuel for engine 50, as well as for furnace 42, when a furnace is provided Power pack assembly 28 additionally includes a condenser coil 54, an engine radiator coil 56, and a fan assembly 58. Fan assembly 58, as best shown in FIG. 2, which is a perspective view of the power pack assembly 28 without the condenser and radiator coils 54 and 56, includes a double-ended fan shaft 60 having a condenser fan 62 and a radiator fan 64 mounted on opposite ends.

Figure 2:
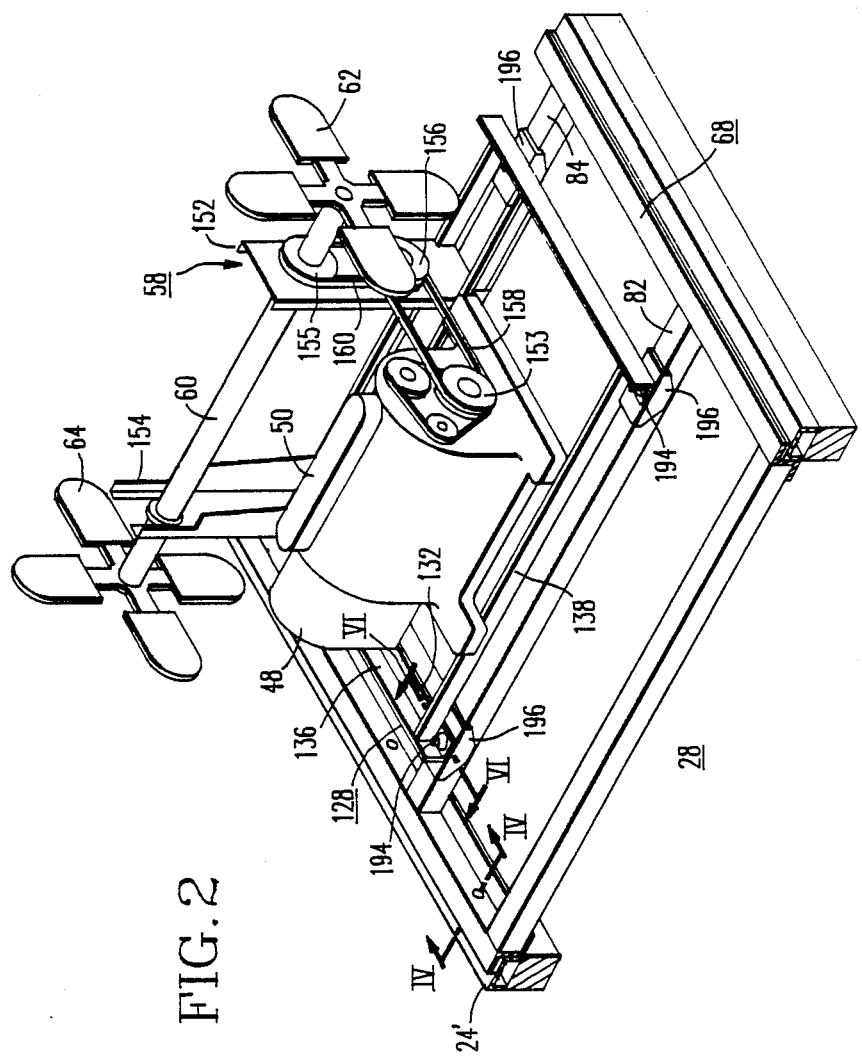
FIG. 2 is a perspective view of the power pack assembly of FIG. 1, constructed according to the teachings of invention.
Figure 3:
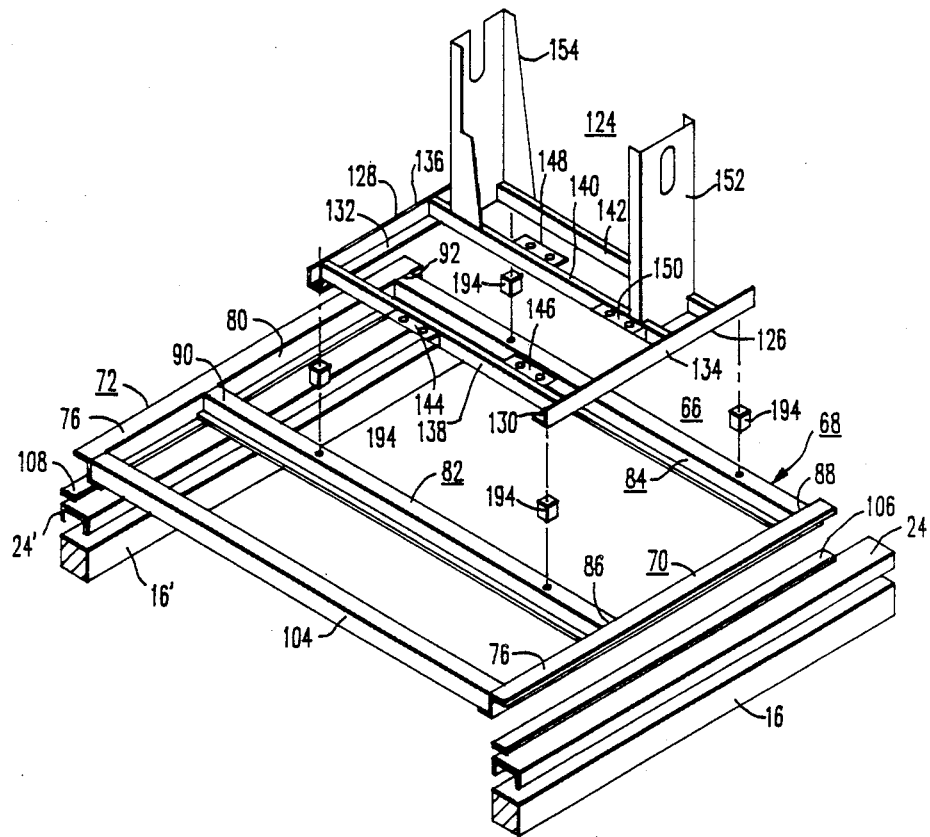
FIG. 3 is an exploded perspective view of a frame portion of the power pack assembly shown in FIG. 2, including a power pack tray and a power pack support frame or sub frame.

As best shown in FIGS. 2 and 3, with FIG. 3 being an exploded perspective view of structural elements 66 of the power pack assembly 28, the power pack assembly 28 is constructed to reduce noise and vibration, by reducing the transmission of vibration into the roof 14 as well as reducing noise emissions into the building.

A first basic sub-assembly of the power pack structural elements 66 includes a power pack support frame or sub frame 68. Support frame 68 includes first and second spaced parallel metallic members 70 and 72. Members 70 and 72 in a preferred embodiment have a substantially Z-shaped cross sectional configuration, including upper and lower leg portions 76 and 78, respectively, and a connecting web portion 80.

Figure 6:
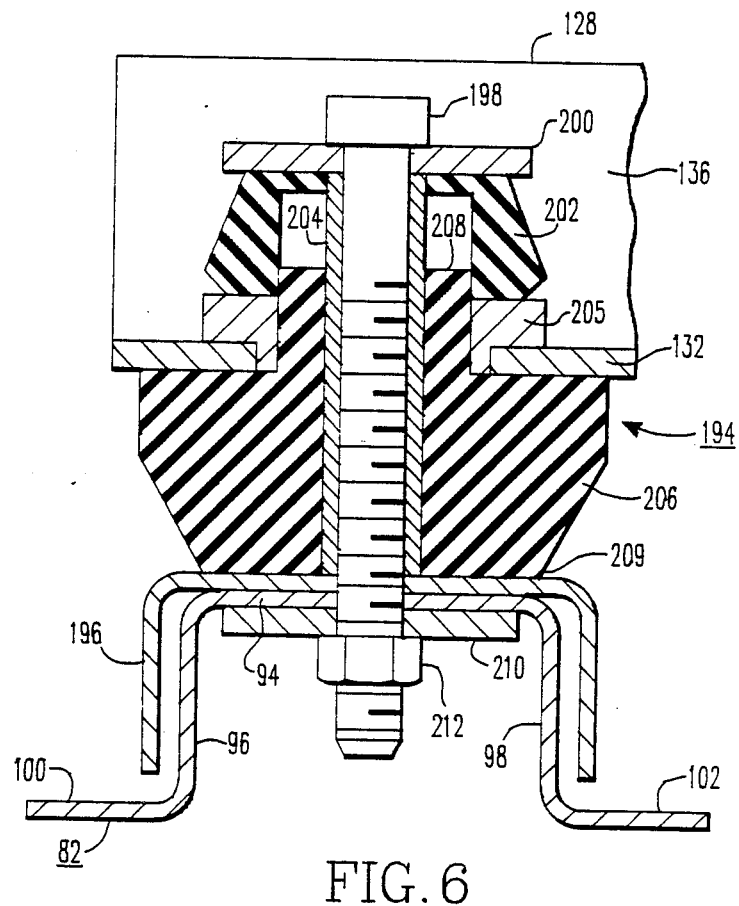
FIG. 6 is a cross sectional view taken between arrows VI—VI in FIG. 2, of an elastomeric vibration mount used to fix the power pack tray to the power pack sub frame.

Power pack support frame 68 further includes third and fourth spaced parallel metallic members 82 and 84 having first ends 86 and 88 welded to the first member 70, and second ends 90 and 92 welded to the second member 72. Members 82 and 84 have a substantially hat-shaped cross sectional configuration, including, as best shown in FIG. 6, a crown or bight 94, first and second spaced depending leg portions 96 and 98, and outwardly extending flanges 100 and 102. Members 82 and 84 which, as will be hereinafter explained, will provide direct support for the movable components of the power pack assembly 28, are formed of a low alloy steel to allow vibration absorption and vertical flexing without fatigue.

A fifth metallic member 104, shown in FIG. 3, may also be provided for further stability of power pack support frame 68. Member 104 is spaced from and parallel to member 82 and member 84.

The first and second metallic members 70 and 72 are substantially continuously supported by side frame channel members 24 and 24' of the main unit frame 22, with the power pack support frame 68 being isolated from the main unit frame 22 by strips 106 and 108 of a cork/rubber material selected for its vibration damping qualities. In a preferred embodiment of the invention, strips 106 and 108 are formed of cork, or a mixture of cork and rubber.

Figure 4:
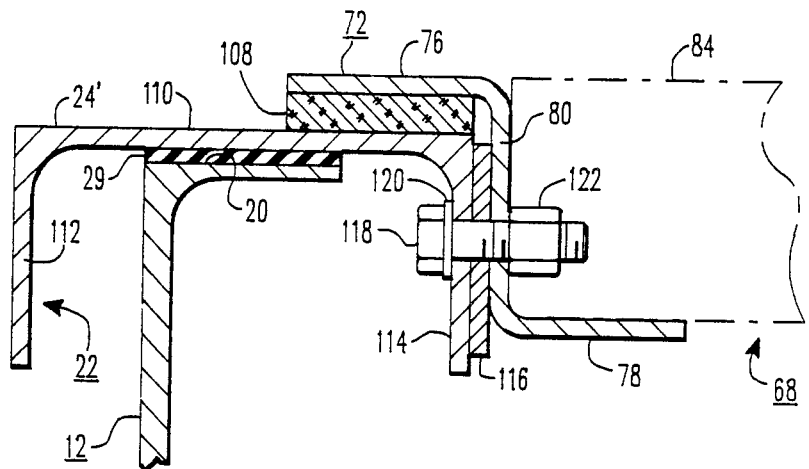
FIG. 4 is a cross sectional view taken between arrows IV—IV in FIG. 2, of an isolation attachment point between the power pack assembly and the main frame of the air conditioning unit.

FIG. 4 is a cross sectional view of an exemplary arrangement for mounting power pack support frame 66 to the main frame 22, with FIG. 4 being taken between and in the direction of arrows IV—IV of FIG. 2. Side frame channel 24' of the main unit frame includes a bight 110 and first and second depending leg portions 112 and 114, respectively. The upper leg 76 of the Z-shaped configuration of metallic member 72 rests upon the bight 110 of side frame channel 24' via the strip of isolating material 108. Web 80 of member 72 has an opening aligned with an opening in leg portion 114, with a suitable spacer member 116 being disposed between web 80 and leg portion 114. A bolt 118 loosely couples the two adjacent portions 80 and 114 via a washer 120 and a nut 122. The loose coupling permits some movement of the ends of frame end members 70 and 72, as members 82 and 84 flex in a vertical plane during service. The third and fourth metallic members 82 and 84, are unsupported, except for their ends, to enable them to absorb vibration by functioning in the same manner as a leaf spring.

A second basic sub-assembly of the power pack structural elements 66 is a power pack support tray 124. The power pack support tray 124 includes first and second metallic right angle members 126 and 128, having lower horizontally oriented leg portions 130 and 132 and upstanding leg portions 134 and 136. First second and third metallic channel members 138, 140 and 142 have their ends welded to members 126 and 128. Engine support pads 144 and 146 are fixed to channel member 138 and engine support pads 148 and 150 are fixed to channel member 140. First and second upstanding fan shaft support members 152 and 154 are fixed to channel members 140 and 142.

All of the movable elements of the power pack assembly 28 are rigidly fixed to the power pack support tray 124, with the engine 50 being directly coupled to compressor 48, providing minimum torque input to the support tray 124. Mounting the components of the power pack to a common structure provides a trouble-free drive belt system which includes a drive pulley 153 on engine 50, a driven pulley 155 on the double ended fan shaft 60, and an idler pulley 156 supported by the upstanding fan shaft support member 152. A belt 158 links pulleys 153 and 156, and a belt 160 links pulleys 156 and 155.

Figure 5:
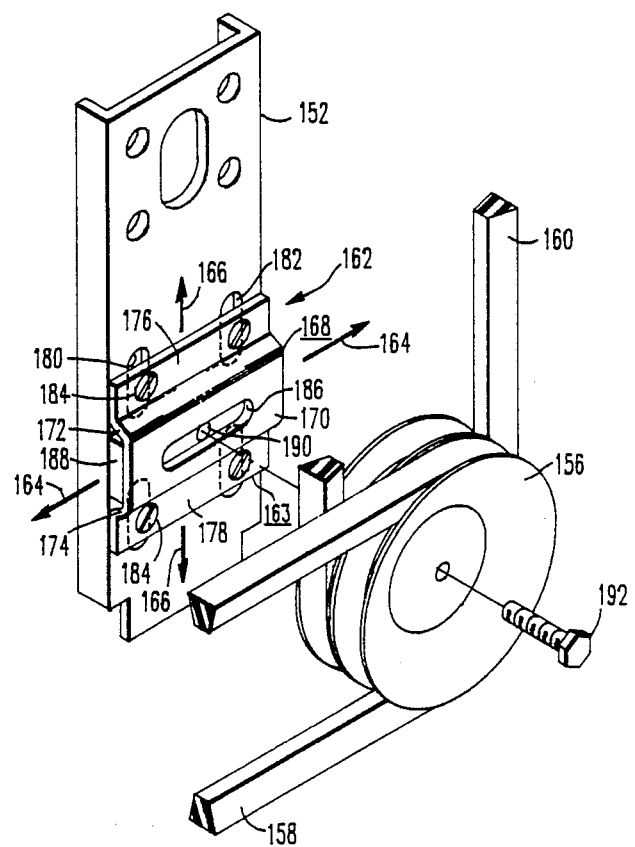
FIG. 5 is a fragmentary exploded perspective view which illustrates the mounting of an idler and belt tension pulley shown in FIG. 2, for simultaneous vertical and horizontal movement.

FIG. 5 is an exploded perspective view of an idler pulley arrangement 162 which permits maximum drive belt wrap on the engine pulley 153 and the shaft pulley 155. Idler pulley arrangement 162 permits easy adjustment of belt tension in both drive belts, allowing horizontal movement, as indicated by arrows 164, and simultaneous vertical movement, as indicated by arrows 166. Idler pulley arrangement 162 includes idler pulley mounting means 163 comprising a bracket 168 having a substantially hat-shaped cross sectional configuration, including a bight 170, first and second legs 172 and 174, and first and second flanges 176 and 178. First and second vertically extending elongated slots 180 and 182 are formed in fan shaft support member 152, and flanges 176 and 178 have openings for receiving nut and bolt assemblies 184 which link the vertically oriented slots 180 and 182 for vertically slidable engagement, which provides the adjustment indicated by arrows 166.

The bight 170 of bracket 168 has a horizontally elongated slot 186 formed therein, and a shoe 188 having a tapped opening 190 is disposed in snug but slidable relation within the opening defined by the spaced leg portions 172 and 174 and bight 170. A bolt 192 secures idler pulley 156 to the slidable shoe 188 via slot 186 and tapped opening 190. The slidable shoe 188 thus provides the movement indicated by arrows 164.

Power pack support tray 124 is vibration isolated from the power pack support frame 68 by four similar elastomeric isolation mounts 194. Mounts 194 are located as far from the engine as possible, i.e., at the very ends of the tray 124, to permit the mounts to be relatively "soft" without sacrificing control of engine motion. Load distribution channels 196 are disposed between the mounts 194 and members 82 and 84 to spread the load away from the openings which receive the mounting bolts of the isolation mounts. Each load distribution channel 196 functions as an additional "leaf" in the leaf spring functions provided by members 82 and 84.

FIG. 6 is a cross sectional view taken between arrows VI—VI in FIG. 2, illustrating an exemplary construction of isolation mount 194. A bolt 198 and washer 200 provide an upper stop against which an upper rubber mount 202 rests. A cylindrical spacer 204 surrounds bolt 198, and a bushing 205 surrounds spacer 204 while centering the assembly in an opening provided in the lower leg portion 132 of right angle member 128. A lower rubber mount 206 is telescoped over bolt 198 and spacer 204. Mount 206 has an upper portion 208 which snugly enters the central opening in bushing 205. A lower portion 209 of the lower mount 206 rests upon a load distribution channel 196 while the bolt 198 extends between aligned openings in the load distribution channel 196 and member 82. A weld nut plate 210 having an opening therein is placed over bolt 198 and a weld nut 212 is engaged with bolt 198 until the weld nut plate 210 is firmly secured against the bight 94 of member 82. The weld nut 212 is then welded to plate 210, to secure the isolation mount in its operating position.

In summary, the power pack elements of power pack assembly 28 of air conditioner unit 10 are designed and interconnected for minimal torque transmission into power pack support tray 124, while providing a long life belt system. The power pack support tray 124 is vibration isolated from the power pack support frame 68 via isolation mounts 194, and the power pack support frame 68 is constructed to reduce vibration transmission into an associated building by a leaf spring construction which permits the power pack assembly 28 to move in a vertical plane on flexible portions of frame members 82 and 84 which are supported only at their ends. Finally, the power pack support frame 68 is vibration isolated from the main unit frame 22 via strips 106 and 108 of vibration isolation material, which includes cork, in a preferred embodiment of the invention.

I claim:

1. An air conditioning unit suitable for gasketed support and mounting on support curbing having first and second curb sides and first and second curb ends which collectively define a continuous support surface, comprising:

a metallic main unit frame having a rectangularly configured outer structure which includes first and second sides and first and second ends for support by the continuous surface of the curbing, a metallic power pack support frame having first and second spaced parallel members substantially continuously supported along their complete lengths by the first and second sides, respectively, of the main unit frame, and third and fourth spaced parallel members each having first and second ends fixed to the first and second parallel members, respectively, with said third and fourth spaced members being unsupported between their fixed ends, such that the third and fourth members function as leaf springs, vibration and sound absorbing means disposed between the first and second members of the power pack support frame and the main unit frame, a refrigerant power pack assembly comprising an internal combustion engine and a refrigerant compressor mounted on a metallic support tray, and a plurality of vibration absorbing mounts for resiliently mounting the support tray of the power pack assembly to the third and fourth spaced members of the power pack support frame, with each of said plurality of vibration absorbing mounts being spaced inwardly from a selected end of the third and fourth members.

2. The air conditioning unit of claim 1 wherein the third and fourth spaced parallel members of the power pack support frame include a plurality of openings for the plurality of vibration absorbing mounts, and including a plurality of load distribution channels disposed between each vibration absorbing mount and an associated third or fourth member, with the load distribution channels functioning as additional leafs of the leaf spring functions provided by the third and fourth members, to prevent the load presented by the refrigerant power pack assembly from concentrating about the plurality of openings.

3. The air conditioning unit of claim 1 wherein the vibration and sound absorbing means disposed between the first and second members of the power pack support frame and the main unit frame includes cork.

4. The air conditioning unit of claim 1 wherein the power pack tray includes first and second spaced upright members which support a fan shaft having a pulley coupled to the internal combustion engine via an idler pulley, and pulley mounting means for mounting said idler pulley to a selected one of said first and second spaced upright members, with said pulley mounting means being constructed to permit the idler pulley to simultaneously move both vertically and horizontally relative to the selected upright member.

5. The air conditioning unit of claim 4 wherein the upright member associated with the pulley mounting means includes a pair of elongated slots having a first orientation, and the pulley mounting means includes a tapped shoe to which the idler pulley is rotatably fixed and a channel member having a bight which defines a slot, leg portions, and mounting flanges, with the mounting flanges of said channel shaped member being mounted for movement via the elongated slots of the upright member, and with the tapped shoe being mounted for movement relative to the channel member via the elongated slot defined by the bight, and wherein the elongated slot defined by the bight is oriented perpendicular to the direction of the elongated slots defined by the upright member.

6. The air unit of claim 1 wherein the internal combustion engine and refrigerant compressor are directly coupled, for minimizing torque input to the support tray.

7. The air conditioning unit of claim 1 wherein the support tray, in addition to the internal combustion engine and refrigerant compressor, carries a double-fan shaft and a belt-pulley with all of said components on the support tray being rigidly mounted.

8. The air conditioning unit of claim 1 wherein the support tray of the power pack has first and second ends respectively spaced the first and second spaced parallel members of the power pack support frame with the plurality of vibration absorbing mounts which mount the support tray to the power support frame being mounted at said first and second ends of the support tray, to space the vibration absorbing mounts as from the internal combustion engine as possible.

* * * * *